(12) United States Patent
Yan et al.

(10) Patent No.: US 6,560,396 B1
(45) Date of Patent: May 6, 2003

(54) VARIABLE OPTICAL ATTENUATOR

(75) Inventors: Mei Yan, Cupertino, CA (US); Hongchuan Wang, Fremont, CA (US)

(73) Assignee: Nexfon Corporation, Fremont, CA (US)

( * ) Notice: Subject to any disclaimer, the term of this patent is extended or adjusted under 35 U.S.C. 154(b) by 0 days.

(21) Appl. No.: 09/606,550

(22) Filed: Jun. 29, 2000

(51) Int. Cl.⁷ .............................. G02B 6/00; G02B 6/27; G02F 1/09
(52) U.S. Cl. ............................ 385/140; 385/6; 359/281; 359/283
(58) Field of Search ................................ 385/140, 4, 6; 359/246, 251–253, 280–284

(56) References Cited

U.S. PATENT DOCUMENTS

| | | | |
|---|---|---|---|
| 6,175,667 B1 | * | 1/2001 | Wang et al. ............ 385/3 |
| 6,181,846 B1 | * | 1/2001 | Pan ............................ 385/18 |
| 6,185,347 B1 | * | 2/2001 | Zheng ........................ 385/34 |
| 6,195,479 B1 | * | 2/2001 | Pan ............................ 385/18 |
| 6,198,567 B1 | * | 3/2001 | Bergmann .................. 359/281 |
| 6,215,923 B1 | * | 4/2001 | Li .............................. 385/24 |

* cited by examiner

*Primary Examiner*—Hemang Sanghavi
*Assistant Examiner*—Omar Rojas
(74) *Attorney, Agent, or Firm*—Bo-In Lin

(57) ABSTRACT

This invention is related to method for assembling an optical attenuator to attenuate an optical beam. The method includes a step of a) collimating the optical beam from an input optical waveguide into a substantially collimated beam comprising an upper segmented-portion and a lower segmented-portion. The method further includes steps of b) transmitting the collimated onto a phase shifting means comprising at least an upper phase shifting means for generating a phase difference between the upper segmented-portion and the lower segmented-portion and c) generating a self-interference between the upper segmented-portion and the lower segmented-portion of the collimated beam and focusing the collimated beam into an output optical waveguide with an attenuation resulting from the self-interference.

15 Claims, 6 Drawing Sheets

VARIABLE OPTICAL ATTENUATOR

BACKGROUND OF THE INVENTION

1. Field of the Invention

This invention relates generally to a method and device for use in optical fiber signal transmission system. More particularly, this invention relates to a method and device for providing a variable optical attenuator.

2. Description of the Prior Art

In fiber optic communication systems, variable optical attenuators are broadly employed to regulate the optical power levels to prevent damages to the optical receivers caused by irregular optical power variations. As the optical power fluctuates, a variable optical attenuator is employed, in combination with an output power detector and a feedback control loop, to adjust the attenuation and to maintain the optical power inputted to a photo-receiver at a relatively constant level.

Variable optical attenuators can be generally classified into two types, namely, mechanical and non-mechanical types. In the mechanical type, the optical power levels are regulated by mechanically moving relative positions between some key optical components. The mechanical type variable optical attenuators have the disadvantages that such attenuators consume large amount of electrical power and have limited lifetime. In the non-mechanical type, regulation of optical power levels is achieved by changing the characteristics of optical components through electrical voltage or current adjustment Compared to the mechanical type, the non-mechanical type has longer lifetime and is more broadly employed in fiber optic communication systems.

FIG. 1 shows the structure of a type of non-mechanical variable optical attenuators. This type of variable optical attenuators include an input optical collimator 15, an input birefringent polarizer 25, a liquid-crystal polarization modulator 50 with a control voltage source 55, an output birefringent polarizer 60, and an output optical collimator 70. In this typical variable optical attenuator, an optical signal 20 coming from the input optical collimator 15 is spatially separated by the input birefringent polarizer 25 into two orthogonally-polarized beams 30 and 35 by employing the birefringent walk-off effect. The horizontally polarized beam 30 is indicated by its polarization direction 45 and the vertically polarized beam 35 is indicated by its polarization direction 40. Then the liquid-crystal polarization modulator 50 intercepts both the two orthogonally polarized beams 30 and 35 and rotates their polarization directions upon the voltage applied by the voltage source 55. At the exit plane of the liquid-crystal polarization modulator 50, the two beams 30 and 35 each carries a mixture of horizontal and vertical polarizations as indicated in FIG. 1. Note that the mixture ratio of the horizontal and vertical polarizations can be adjusted by changing the voltage applied on the liquid-crystal polarization modulator 50. Then both the beams 30 and 35 enter the output birefringent polarizer 60 having the same thickness as the input birefringent polarizer 25. The output-birefringent polarizer 60 spatially separates the two sets of the orthogonal polarizations carried by the two beams 30 and 35 into four beams. The mixture ratio of the four beams are determined by the mixture ration of the horizontal and vertical polarizations of the two original beams and can be adjusted by changing the voltage applied on the liquid-crystal polarization modulator 50. Finally, the vertically polarized component of the upper beam 30 is combined with the horizontal-polarized component of the lower beam 35 and then exits from the output birefringent polarizer 60 into the output optical collimator 70. The horizontal-polarized component of the upper beam 30 and the vertically polarized component of the lower beam 35 are guided to transmit away from the output optical collimator 70 and dissipated. As the optical power level at the output optical collimator 70 in this typical variable optical attenuator is determined by the mixture ratio of the four polarization beams, then the optical power level at the output optical collimator 70 can be electrically adjusted. Electrical adjustments can be achieved by adjusting the voltage applied on the liquid-crystal polarization modulator 50. The technical details of the typical attenuator that utilizes dual birefringent polarizers is more fully described in U.S. Pat. No. 5,963,291, entitled "Optical Attenuation Using Polarization Modulation and a Feedback Controller", by Wu et al. The disclosure made in U.S. Pat. No. 5,963,291 is hereby incorporated by reference in this Patent Application as part of the background of this invention.

While the typical variable optical attenuator as shown in FIG. 1 functions properly under most circumstances, it is limited by two major disadvantages. First, the typical attenuator employs two birefringent polarizers and thus has relatively high material cost. Second, since the typical attenuator employs two birefringent polarizers, polarization dependence loss often becomes a problem that adds to the uncertainties of the performance unless these two birefringent polarizers are perfectly aligned. In order to reduce polarization dependence loss, more stringent alignment requirements are implemented in the manufacture processes and thus cause the manufacture processes to be more time consuming and also more costly. Greater amount of time, efforts and costs are spent in manufacturing the typical attenuator due to the configuration that utilizes the dual birefringent polarizers. Due to a configuration implemented with birefringent polarizers, those of ordinary skill in the art for manufacturing the non-mechanical type of variable optical attenuators are still confronted with a difficulty that the material and assembly costs of the variable optical attenuator are quite high and cannot be easily reduced.

Thus, further development of new configurations in manufacturing the variable optical attenuators is required to provide attenuators that can be manufactured at lower material and assembly costs and with better polarization dependence losses. Particularly, a need still exists in the art of design of non-mechanical variable optical attenuators to provide new device structures without the use of birefringent polarizers is required to overcome the difficulties discussed above. By eliminating the use of birefringent polarizer, a non-mechanical variable optical attenuator with lower material and assembly costs and near-zero polarization dependent losses can be achieved.

SUMMARY OF THE PRESENT INVENTION

It is therefore an object of the present invention to provide a new design for a non-mechanical variable optical attenuator that has near-zero polarization dependence loss and low material and assembly cost when compared with the conventional one as described above. By implementing the new and improved attenuator of this invention, the aforementioned difficulties in the prior art can be overcome.

Specifically, it is an object of the present invention to provide a non-mechanical variable optical attenuator arranged with a configuration to enable a self-interference between the segmented portions of a collimated beam. The self-interference is achieved by first generating a collimated beam, applying separate optical processes to the segmented portions of the collimated beam, and then inducing and controlling interference between the segmented portions. In this new non-mechanical variable optical attenuator, regulation of the optical power level is carried out by adjusting the degree of self-interference and that is in turn achieved by controlling the relative phase difference between the segmented portions of the collimated beam. The attenuation is generated without the use of birefringent polarizers. By eliminating the use of the birefringent polarizers, the variable optical attenuator of this invention can be produced at lower cost. The polarization dependence loss is maintained near zero. Therefore, the new and improved non-mechanical variable optical attenuator can be employed in fiber optic communications for broaden applications without being limited by the cost and polarization dependence loss problems as encountered in the prior art.

Another object of the present invention is to provide a simplified reflective type of a non-mechanical variable optical attenuator that can further reduce the material cost by employing a reflective mirror for reflecting an collimated composite beam with the phase difference back to the same lens. Cost savings are achieved by employing only one lens and one fiber pigtail.

Briefly, in a preferred embodiment, the present invention discloses a non-mechanical variable optical attenuator. The attenuator includes an input optical waveguide and a collimating means for collimating the optical beam from the input waveguide. The collimated beam is separable into an upper segmented-portion and a lower segmented-portion. The attenuator further includes a phase shifting means selectively generating a phase difference between the upper segmented-portion and the lower segmented-portion of the beam. The attenuator further includes a focusing means for focusing the collimated beam into an output optical waveguide. In a preferred embodiment, the phase shifting means further comprising a controller for controlling the phase shifting means for generating a variable phase difference. In a preferred embodiment, the phase shifting means comprising a polarization rotation means for rotating a polarization direction of the upper segmented-portion and an optical plate to pass the lower segmented-portion with no change of polarization direction to compensate the optical path-length difference between the upper segmented-portion and the lower segmented-portion. In a preferred embodiment, the collimating means comprising a GRIN lens for collimating the optical beam into a collimated beam. In a preferred embodiment, the collimating means further comprising a single optic fiber for receiving and projecting the optical beam to the GRIN lens. In a preferred embodiment, the focusing means further comprising an output single mode fiber and a second GRIN lens for focusing the expanded collimated beam into the output fiber.

Alternately, the invention also discloses a non-mechanical variable optical attenuator that includes a collimating means for collimating the optical beam into an collimated beam separable into an upper segmented-portion and a lower segmented-portion. The attenuator further includes a phase shifting means comprising an upper polarization means and a lower polarization means for receiving the collimated beam for generating a phase difference between the upper segmented-portion and the lower segmented-portion. The attenuator further includes a reflecting means for reflecting the collimated beam back to the collimating means for focusing the collimated beam into an output optical beam.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
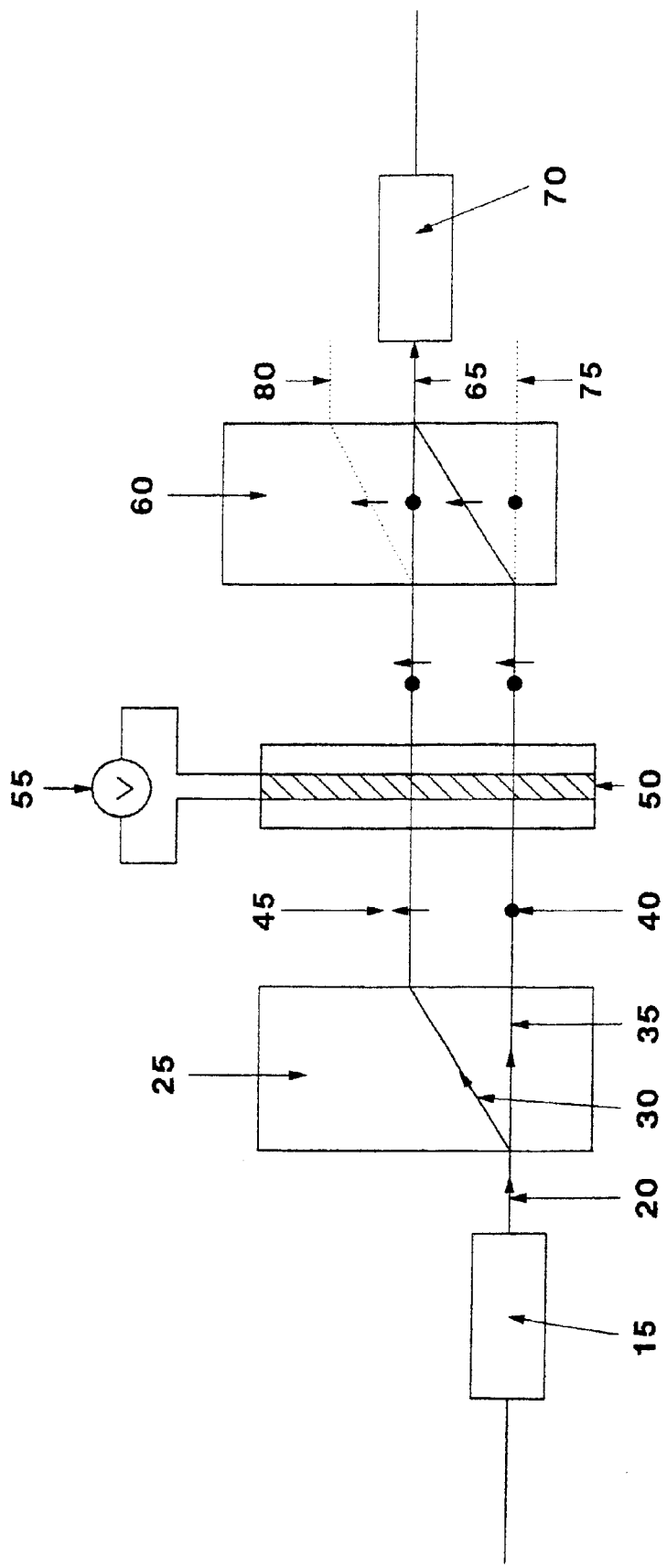
FIG. 1 is a cross sectional view of a conventional non-mechanical variable optical attenuator.
Figure 2:
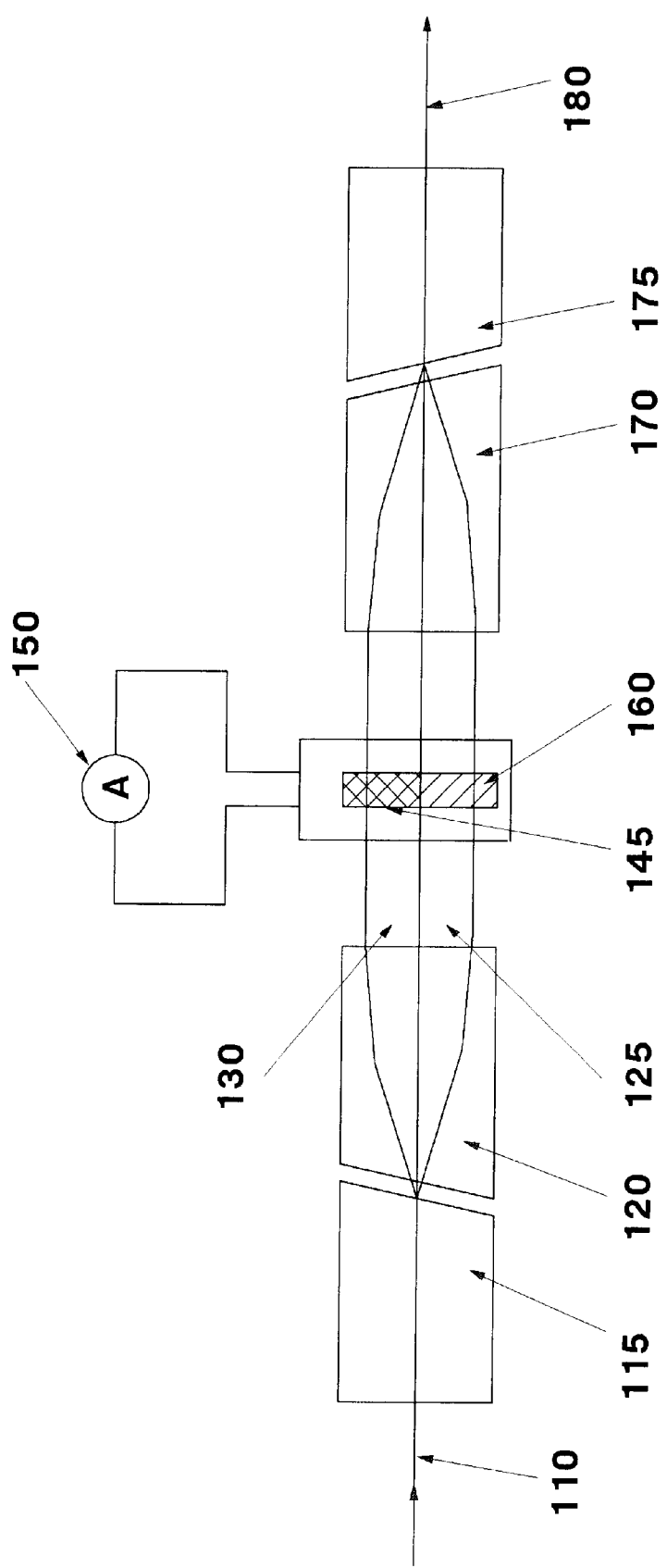
FIG. 2 is a cross sectional view of the transmission-type of the non-mechanical variable optical attenuator according to this invention.

Referring to FIG. 2 for an improved configuration of a new non-mechanical variable optical attenuator that enables a self-interference between the segmented portions of a collimated beam for controlling the attenuation. The attenuator includes an input fiber pigtail 115 having an optical fiber 110 transmitting an input optical beam. A first GRIN lens 120 implemented as a collimating lens is placed at a prearranged position to receive the input optical beam projected from the single fiber pigtail 115. By projecting the optical beam from the single input fiber pigtail 115 at the focal point of the GRIN lens 120, a collimated beam is generated as the beam passes through the GRIN lens 120. For the purpose enabling the self-interference to attenuate an optical beam, the collimated beam is divided into a lower segmented portion 125 and an upper-segmented portion 130.

The upper-segmented portion of the collimated beam is then launched onto a phase modulator. The phase modulator includes a variable phase shifter 145 controlled by a control source 150. The phase of the upper segmented-portion of the optical beam is shifted to a specific amount 155. The amount of phase shift is dependent upon the control signal 150 applied to the phase shifter means 145. In the meantime, the lower segmented portion of the optical beam passes through a transparent optical plate 160 with a fixed phase. The use of the optical plate 160 is to compensate the optical path-length difference between the upper and lower segmented portions, which is generated by the phase shifter. The collimated beam now becomes a "composite collimated beam" that includes an upper segment portion having a phase 155 and a lower segmented portion having a phase 165. The composite collimate beam is then projected onto a focusing GRIN lens 170 to focus the composite collimated beam into a focused optical beam to pass through an output optical fiber pigtail 175 and transmit an output signal into an output optical fiber 180. A self-interference process is generated when the composite collimated beam passes through the focusing GRIN lens 170. The self-interference operation is carried out between the upper segmented-portion having a phase shifted to 155 with the lower segmented portion having a fixed phase 165. When phase 155 equals to phase 165, the composite collimated beam generate a beam equivalent to fundamental mode and is transmitted through the output fiber without attenuation. When the phase difference between 155 and 165 equals to π, the composite collimated beam generate a beam equivalent to higher order mode of the fiber thus is transmitted through the output fiber with high attenuation. Therefore, the output power from the output fiber can be varied by adjusting the phase difference between 155 and 165 from zero degree to 180-degrees, i.e., π. Since the optical path-length difference between the upper and lower segmented portions of the composite collimated beam is compensated, the wavelength dependence of the attenuator is significantly reduced.

Figure 3:
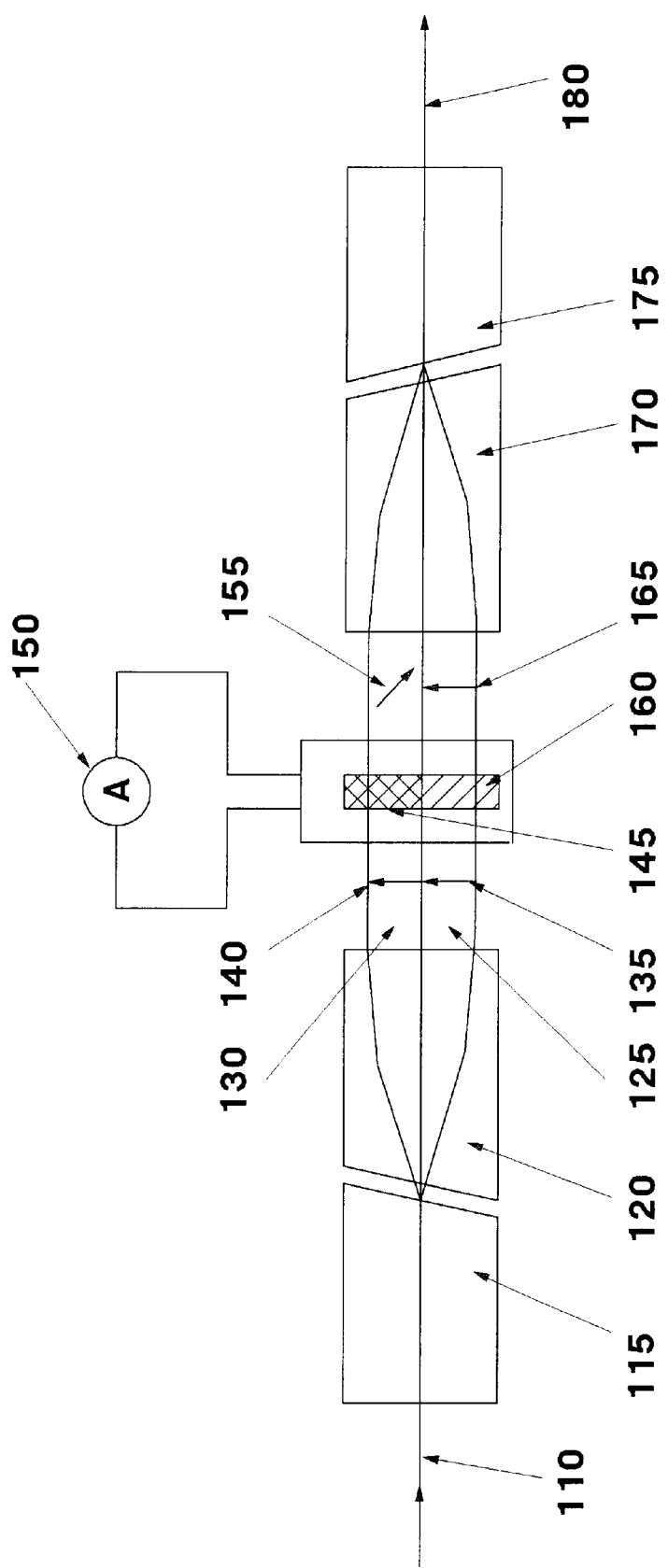
FIG. 3 is a cross sectional view of the transmission-type of the non-mechanical variable optical attenuator according to this invention.

Referring to FIG. 3 for another improved configuration of a new non-mechanical variable optical attenuator that enables a self-interference between the segmented portions of a collimated beam for controlling the attenuation. The attenuator includes an input fiber pigtail 115 having an optical fiber 110 transmitting an input optical beam. A first GRIN lens 120 implemented as a collimating lens is placed at a prearranged position to receive the input optical beam projected from the single fiber pigtail 115. By projecting the optical beam from the single input fiber pigtail 115 at the focal point of the GRIN lens 120, a collimated beam is generated as the beam passes through the GRIN lens 120. For the purpose enabling the self-interference to attenuate an optical beam, the expanded collimate beam is divided into a lower segmented portion 125 and an upper-segmented portion 130. The upper and lower segmented portions of the beam have a same polarization direction as that shown by the polarization direction vectors 135 and 140 respectively.

The collimated beam, comprising the upper and lower segmented portions, is then projected onto a polarization modulator. The polarization modulator includes an upper polarization tuning means 145 in forms of Faraday rotator controlled by a variable current source 150. The polarization direction of the upper segmented-portion of the optical beam is rotated to a specific position 155. The amount of polarization rotation is dependent upon the current 150 applied to the polarization tuning means 145. In the meantime, the lower segmented portion of the optical beam passes through a transparent optical plate 160 no change of polarization direction thus maintaining a same polarization position 165 that is kept the same as the original polarization angle 135. The use of the optical plate 160 is to compensate the optical path-length difference between the upper and lower segmented portions, which is generated by the polarization tuning means. The collimated beam now becomes a "composite collimated beam" that includes an upper segment portion having a polarization direction 155 and a lower segmented portion having a polarization direction 165. The composite expanded collimate beam is then projected onto a focusing GRIN lens 170 to focus the composite expanded collimate beam into a focused optical beam to pass through an output optical fiber pigtail 175 and transmit an output signal into an output optical fiber 180. A self-interference process is generated when the composite collimated beam passes through the focusing GRIN lens 170. The self-interference operation is carried out between the upper segmented-portion having a polarization rotated to 155 with the lower segmented portion having an original polarization 165. An attenuation effect is generated through the self-interference and the self-interference based attenuation is controllable by adjusting the current 150 to control the rotation of the polarization direction 155. When the controlling current 150 is increased, the polarization of the upper segmented-portion is rotated to a greater shift from the original polarization direction to generate a greater degree of self-interference thus producing a greater amount of signal attenuation. Since the optical path-length difference between the upper and lower segmented portions of the composite collimated beam is compensated, the wavelength dependence of the attenuator is significantly reduced.

Figure 4:
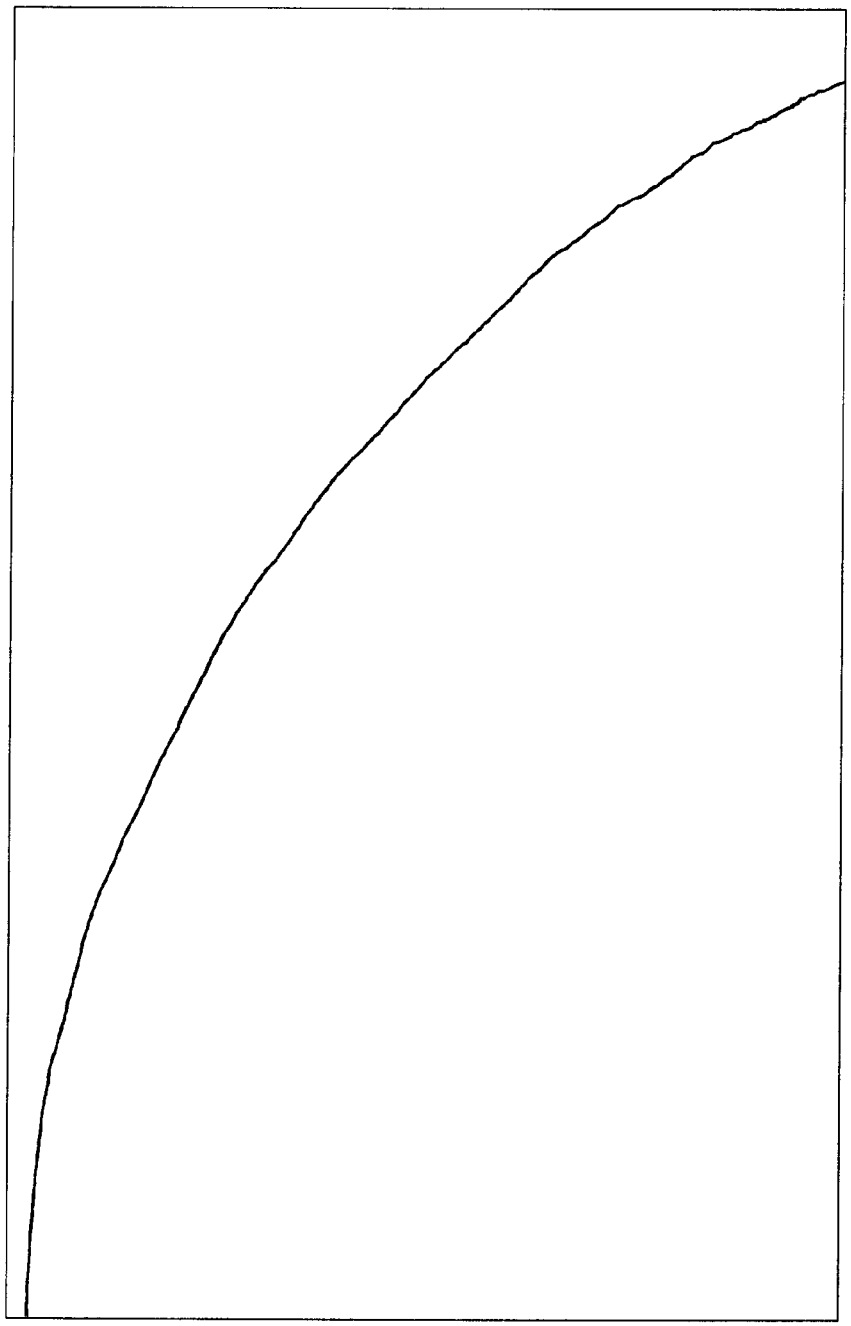
FIG. 4 shows the applied current dependence of the optical power level of the non-mechanical variable optical attenuator of this invention.

FIG. 4 is an exemplary curve representing a functional relationship between the controlling current applied to the polarization tuning means 145 versus the percentage of signal transmission. The amount of signal transmission is decreased when the applied current 150 is increased as shown by the curve of FIG. 3. Through a self-interference process between two segmented portions of a composite collimate beam, the function of the optical power attenuation is realized by this totally new attenuator configuration. Such self-interference process can be controlled for signal attenuation without the requirement of employing birefringent polarizers. The material and assembly costs can be significant reduced when birefringent polarizers are no longer required. In the meantime, by eliminating the optical processes of generating two orthogonally polarized beams by using birefringent polarizers, the polarization dependence loss is reduced to a negligible level.

According to the above descriptions, a method for attenuating an optical signal is disclosed. The method includes steps of: a) collimating the optical beam into an collimated beam comprising an upper segmented-portion and a lower segmented-portion; b) transmitting the upper segmented-portion of the collimated beam onto a phase shifter for generating a phase difference between the upper segmented-portion and the lower segmented-portion; and c) focusing the collimated beam into an output single-mode waveguide.

According to the above descriptions, a method for attenuating an optical signal is disclosed. The method includes steps of: a) collimating the optical beam into an collimated beam comprising an upper segmented-portion and a lower segmented-portion; b) transmitting the collimated onto a polarization module comprising an upper polarization means and a lower polarization means for generating a polarization direction difference between the upper segmented-portion and the lower segmented-portion; and c) focusing the collimated beam into an output single-mode optical waveguide. In a preferred embodiment, the steps of b) of generating a polarization direction difference between the upper segmented portion and the lower segmented portion further comprising a step of applying an electric current controller to the polarization modulator for generating the polarization direction difference. In another preferred embodiment, the step of b) of generating a polarization direction difference between the upper segmented portion and the lower segmented portion further comprising a step of employing an electric current controllable polarization rotation means for rotating a polarization direction of the upper segmented-portion and employing an optical plate to pass the lower segmented-portion with no change of polarization direction to compensate the optical path-length difference between the upper and lower segmented-portions. In another preferred embodiment, the step a) of collimating an optical beam into a collimated beam comprising a step of projecting an optical beam to a GRIN lens for collimating the optical beam. In another preferred embodiment, the step a) of projecting an optical beam to a GRIN lens further comprising a step of inputting an optical beam through a single optic fiber pigtail for projecting the optical beam to the GRIN lens. In another preferred embodiment, the step c) of focusing the collimated beam into an output single-mode optical waveguide comprising a step of projecting the collimated beam with the polarization direction difference to a second GRIN lens for focusing the collimated beam In another preferred embodiment, the step b) of focusing the expanded collimate beam into a focus beam further comprising a step of focusing the collimated beam to an output single-mode fiber pigtail.

Figure 5A:
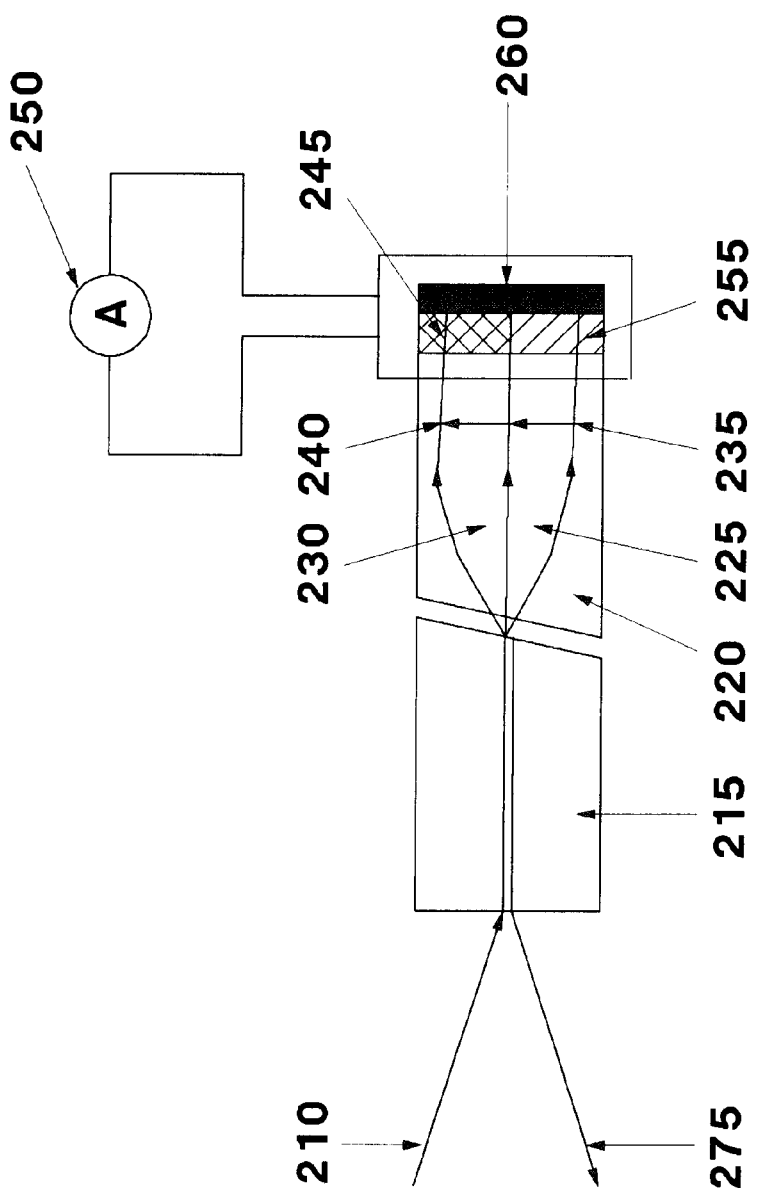
FIGS. 5A and 5B are cross sectional views of the reflection-type of the non-mechanical variable optical attenuator according to this invention.
Figure 5B:
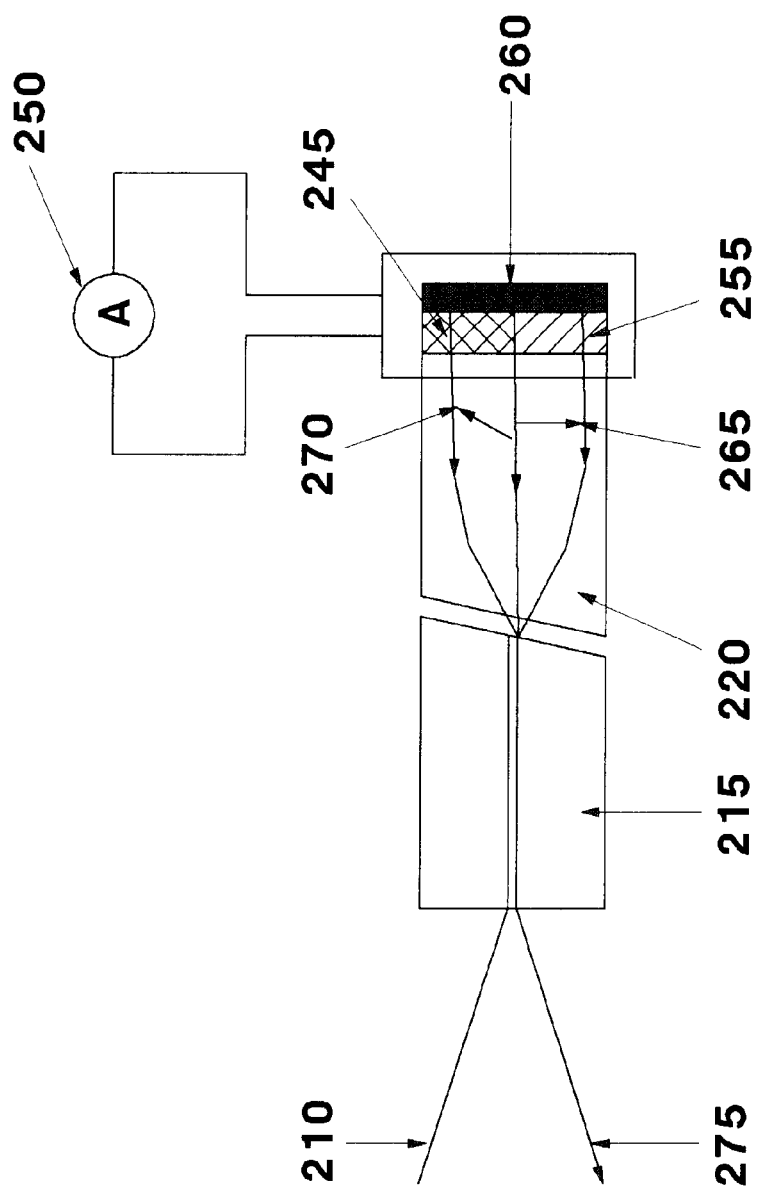

Referring to FIGS. 5A and 5B for an alternate configuration of a reflective non-mechanical variable optical attenuator of this invention that enables a self-interference between the segmented portions of an collimated beam for controlling the attenuation. The attenuator includes a dual single-mode fiber pigtail 215 having an input optical fiber 210 transmitting an input optical beam. A GRIN lens 220 implemented as a collimating-and-focusing GRIN lens is placed at a prearranged position to receive the input optical beam projected from the dual fiber pigtail 215. Referring to FIG. 5A for the input optical beam projected from the dual fiber pigtail 215 at the focal point of the GRIN lens 220, a collimated beam is generated as the beam passes through the GRIN lens 220. For the purpose of enabling the self-interference, the collimated beam is divided into a lower segmented beam portion 225 and an upper segment portion 230, and each of these segmented beam portions has a same polarization direction represented by the vectors 235 and 240 respectively.

The collimated beam comprising the upper and lower segmented portions, is then projected onto a polarization modulator. The polarization modulator includes an upper polarization tuning means 245 controlled by a variable current source 250. The polarization direction of the upper segmented-portion of the optical beam is rotated to a specific position. The amount of polarization rotation from the original polarization direction is dependent upon the current applied to the polarization tuning means 245. In the meantime, the lower segmented portion of the optical beam passes through a transparent optical plate 255 with no change of polarization direction to compensate the optical path-length difference thus maintaining a same polarization position that is kept the same as the original polarization direction. The collimated beam now becomes a "composite collimated beam" that includes an upper segment portion having a polarization direction and a lower segmented portion having another polarization direction. The composite collimated beam is then projected onto a reflective mirror 260 for reflecting the composite collimated beam back to the GRIN lens 220 through the polarization modulator as that shown in FIG. 5B. Note that when the composite collimated beam is reflected back by the mirror 260, both the polarization directions of the upper and lower segmented portions will be rotated 180 degrees but the polarization direction difference between them will remain unchanged. Then when the composite collimated beam with the upper and lower segmented portions pass back through the polarization modulator, the polarization direction of the upper segmented portion will be rotated again while that of the lower segmented portion will remain unchanged. Thus, the polarization direction difference between the upper and lower segmented portions will be doubled. The polarization directions of the upper and lower segmented portions of the composite collimated beam are indicated by the vectors 265 and 270 respectively. After passing through the GRIN lens 220, the composite collimated beam reflected from the reflective mirror 260 is focused into the output optical fiber 275 of the dual pigtail 215.

A self-interference process is generated after the composite collimated beam passes through the GRIN lens 220 and output optical fiber 275. The self-interference operation is carried out between the upper and lower segmented-portions having different polarization directions. An attenuation effect is generated through the self-interference and the self-interference based attenuation is controllable by adjusting the current source 250 to control the rotation of the polarization direction of the upper segmented portion. When the controlling current 250 is increased, the polarization direction of the upper segmented-portion is rotated to a greater shift from that of the lower segmented portion to generate a greater degree of self-interference thus producing a greater amount of signal attenuation. This reflective type of attenuator has the advantage of achieving additional cost savings by not using two lenses and two fiber pigtails as that shown in FIG. 3. The reflective type of attenuator as shown in FIGS. 5A and 5B further has an advantages that the volume occupied by the attenuator is reduced because less number of optical components are used when compared with the transmissive type of attenuator shown in FIG. 3.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention. For example, various other types of lenses such as spherical and aspherical lenses, fiber lenses can be used for collimating and focusing the beam. Various types phase shifting means such as liquid crystal phase shifter, $LiNbO_3$, Faraday rotators, etc. can be used to provide the variable phase shift.

We claim:

1. A method for attenuating an optical beam comprising steps of:

a) collimating and expanding said optical beam into an expanded collimated-beam comprising an upper segmented-portion and lower segmented-portion;

b) transmitting said expanded collimated-beam onto a polarization module comprising an upper polarization rotation means for rotating a polarization direction of said upper segmented-portion and passing said lower segmented-portion with no change of a polarization direction; and c) focusing said upper segmented-portion and said lower segmented-portion of said expanded collimated-beam with a polarization angular difference into an output optical beam with an attenuation resulting from a self-interference between said upper and lower segmented portions.

2. The method of claim 1 wherein:

said step a) of collimating and expanding an optical beam into an collimated beam comprising a step of projecting an optical beam to a GRIN lens for collimating and expanding said optical beam.

3. The method of claim 2 wherein:

said step a) of projecting an optical beam to a GRIN lens further comprising a step of inputting an optical beam through a single optic fiber pigtail for projecting said optical beam to said GRIN lens.

4. The method of claim 1 wherein:

said step c) of focusing said collimated beam into an output optical waveguide comprising a step of projecting said expanded collimate beam with said phase difference to a second GRIN lens for focusing said focusing said composite collimated beam.

5. The method of claim 4 wherein:

said step c) of focusing said composite collimated beam into a focus beam further comprising a step of focusing said composite collimated beam to an output single mode optic-fiber.

6. The method of claim 1 wherein:

said step c) of focusing said composite collimated beam into an output optical waveguide comprising a step of reflecting said collimated beam with said phase difference to said GRIN lens for focusing said collimated beam into a focus beam.

7. The method of claim 2 wherein:

said step a) of projecting an optical beam to a GRIN lens further comprising a step of inputting an optical beam through an input optic fiber of a dual optic fiber pigtail for projecting said optical beam to said GRIN lens.

8. The method of claim 6 wherein:

said step b) of focusing said collimated beam into a focus beam further comprising a step of focusing said expanded collimate beam to an output optic fiber of a dual optic-fiber pigtail as an output focus beam.

9. A variable optical attenuator comprising:

a collimating and expanding means for collimating said optical beam into an collimated beam separable into an upper segmented-portion and lower segmented-portion;

a polarization modulator comprising a polarization rotation means for rotating a polarization angle of said upper segmented-portion and a plane-lens to pass said lower segmented-portion with no change of polarization angle for projecting said upper segmented-portion and said lower segmented portion with a phase difference; and a focusing means for focusing said collimated beam into an output optical beam.

10. The variable attenuator of claim 9 wherein:

said plane-lens comprising an optical plate to pass said lower segmented-portion with no change of polarization direction to compensate an optical path-length between said upper segmented-portion and said lower segmented-portion.

11. The variable attenuator of claim 9 wherein:

the polarization rotation means of said polarization modulator further comprising a Faraday rotator.

12. The variable attenuator of claim 9 wherein:

said collimating and expanding means comprising an GRIN lens for collimating said optical beam into a collimated beam.

13. The variable attenuator of claim 10 wherein:

said collimating means further comprising a single optic fiber pigtail for receiving and projecting said optical beam to said GRIN lens.

14. The variable attenuator of claim 12 wherein:

said focusing and self-interference means further comprising an output single optic fiber pigtail for receiving said focused beam from said GRIN lens as an output focus beam.

15. The variable attenuator of claim 9 wherein:

said focusing means further comprising an output single mode optic fiber pigtail for receiving said focused beam from said GRIN lens.

* * * * *